(12) United States Patent
Park

(10) Patent No.: US 9,398,430 B2
(45) Date of Patent: Jul. 19, 2016

(54) CONTROLLING COMMUNICATION ARRIVAL INDICATORS

(71) Applicant: Sang Yong Park, Daegu (KR)

(72) Inventor: Sang Yong Park, Daegu (KR)

(*) Notice: Subject to any disclaimer, the term of this patent is extended or adjusted under 35 U.S.C. 154(b) by 0 days.

(21) Appl. No.: 14/422,166

(22) PCT Filed: Aug. 16, 2013

(86) PCT No.: PCT/KR2013/007376
§ 371 (c)(1),
(2) Date: Feb. 17, 2015

(87) PCT Pub. No.: WO2014/027855
PCT Pub. Date: Feb. 20, 2014

(65) Prior Publication Data
US 2015/0245185 A1    Aug. 27, 2015

(30) Foreign Application Priority Data

Aug. 17, 2012  (KR) ................ 10-2012-0090209
Nov. 3, 2012   (KR) ................ 10-2012-0123860
Dec. 10, 2012  (KR) ................ 10-2012-0142729
Dec. 10, 2012  (KR) ................ 10-2012-0142730

(51) Int. Cl.
| | |
|---|---|
| *H04W 4/12* | (2009.01) |
| *H04W 4/16* | (2009.01) |
| *H04W 88/02* | (2009.01) |
| *H04W 68/00* | (2009.01) |
| *H04M 3/42* | (2006.01) |

(52) U.S. Cl.
CPC .......... *H04W 4/16* (2013.01); *H04M 3/42* (2013.01); *H04W 4/12* (2013.01); *H04W 68/00* (2013.01); *H04W 88/02* (2013.01)

(58) Field of Classification Search
CPC ............. H04L 29/08108; H04M 2207/18; H04M 3/42; H04W 4/02; H04W 8/18; H04W 4/16; H04W 4/12; H04W 68/00; H04W 88/02; G06Q 30/02
See application file for complete search history.

(56) References Cited

U.S. PATENT DOCUMENTS

2013/0297387 A1* 11/2013 Michael ............... G08G 1/0112
                                                  705/13
2013/0324071 A1* 12/2013 Huh ........................ H04W 4/22
                                                  455/404.1

FOREIGN PATENT DOCUMENTS

KR    10-2002-0049167    6/2002
KR    10-2010-0118694    11/2010

* cited by examiner

*Primary Examiner* — Ted Wang
(74) *Attorney, Agent, or Firm* — Perkins Coie LLP

(57) ABSTRACT

The present invention relates to a user interface method for controlling output of a reception signal sound of a smart device. The method of the present invention includes a step of executing the call-keeper application to select a call-keeper mode (including a mode name and a time for controlling output of the reception sound signal) for blocking output of the reception signal sound through a mode setting user interface. When the time for blocking output of the reception signal sound in a designated mode expires, communication is performed normally without controlling output of the reception signal sound according to classification.

18 Claims, 9 Drawing Sheets

CONTROLLING COMMUNICATION ARRIVAL INDICATORS

CROSS REFERENCE TO RELATED APPLICATIONS

This patent document is a 35 U.S.C. §371 National Stage application of International Application No. PCT/KR2013/007376, filed on Aug. 16, 2013, which further claims the benefit of priority to Korean Patent Application No. 10-2012-0090209, filed on Aug. 17, 2012, Korean Patent Application No. 10-2012-0123860, filed on Nov. 3, 2012, Korean Patent Application No. 10-2012-0142729, filed on Dec. 10, 2012, and Korean Patent Application No. 10-2012-0142730, filed on Dec. 10, 2012. The entire disclosures of the above applications are incorporated by reference as part of this document.

TECHNICAL FIELD

The present invention relates to function control of software (operating system software or application software) using a smart device, and more particularly, to a software-based service provided using an account and an address book of a user.

BACKGROUND ART

As the market of smartphones or tablet PCs has grown in the mobile industry, a conventional mobile communication service based on feature phones has been subject to a great change. A smartphone does not simply operate as a mobile phone, but operates as a small hand-held computer to provide various functions that have not been provided before. Furthermore, a smartphone enables provision of new services.

A smart device is provided with an application environment associated with operating system software, on the basis of improved computing functions. A platform guarantees distribution of various applications, and there exist applications installed in a smart device according to selection by a user via the platform to provide various utilities and game environments. Users may enjoy new user experiences by installing various applications in their smart devices.

For example, users perform voice communication or make calls for free using messenger applications. Furthermore, the users exchange text messages (mobile instant messages (MIMs)) using the messenger applications. When the text messages are exchanged through the messenger applications, smart devices display notification messages for notifying reception of messages on displays with sound effects.

A notification message for a smart device is not limited to a messenger application. In the case of SNS applications such as Facebook™ or Twitter™, each SNS platform transmits a notification message to a smart device of a user to notify various events occurring on a SNS account of the user. Furthermore, when an update event of a game or utility application occurs or messages are transmitted/received through a messenger module of the application, a notification message is also transmitted to a smart device.

It does not cause a particular problem to attempt communication or "transmit" text messages using various types of application software, since such an act is voluntarily done by a user. However, users often do not welcome a communication such as a call or a certain notification message received suddenly from somebody.

In particular, spam messages or advertising message are representative examples of such a case. When a call connection for a telephone call is requested or a text message is received by a smart device, the smart device emits a predetermined reception sound. The reception sound is selected from a ring sound and a vibration sound according to a user setting. Whenever a spam call or a spam message is received, a smart device emits a ring sound or a vibration sound, bothering or annoying a user of the device. Sometimes, such a message startles a user or disrupts work of the user. In particular, due to overflowing application software of smart devices at the present day, bother or annoyance caused by reception sounds is more increased. This situation is totally different from that caused by conventional spam calls/spam messages.

Meanwhile, it has been an issue for a long time in this field to block spam calls or spam message in order to protect the rights and interests of users. Various techniques have been applied to block such calls or messages. One of representative techniques is to automatically block a spam communication so that the spam communication is not received if a user registers a sender of the spam communication in a device. However, conventional techniques are limited since the conventional techniques do not consider a psychological state and request of a user who is not willing to receive a communication even if the communication is not a spam communication. Furthermore, incoming spam text messages, i.e., spam SMS or MMS messages, sent using telephone numbers may be blocked, but it is difficult to block various notification messages, call attempts and text messages of MIM operated on the basis of an account and an address book of a smart device application.

Due to a human relationship or psychological phenomenon of a user, the user may be or may not be willing to receive a communication depending on a sender of the communication even if the communication is not a spam communication. This is particularly true for people nowadays who are living in the flood of messages. However, in many cases, a specific sender cannot be registered as a spam sender only for the reason that the user is not willing to receive a communication from the specific sender. If the specific sender is registered as a spam sender, even important, urgent or essential information from the specific sender may be blocked. Therefore, the user may be subject to misunderstanding or criticism with respect to a human relationship, or, sometimes, unexpected loss or conflict may occur.

To solve the above-mentioned problems, the inventor of the present invention has completed the present invention after conducting research with an effort for a long time.

DISCLOSURE OF THE INVENTION

Technical Problem

An object of the present invention is to provide a novel method for efficiently blocking generation of a reception sound due to various notification systems by reflecting a psychological state or a human relationship of a user. Various notifications embraced by the present invention include not only a call attempt or a notification message transmitted via application software installed in a smart device, i.e., an application platform, but also a message and a call attempt received via a mobile communication network.

To reflect the psychological state of the user, the present invention has been developed to include all the following situations for blocking generation of the reception sound:

1. blocking the reception signal sound when another operation is performed while the smart device is manipulated;

2. blocking the reception signal sound of a call or a message from a specific sender when the smart device is manipulated or is not manipulated;

3. blocking the reception signal sound while sleeping;

4. blocking the reception signal sound while having a meeting; and 5. blocking the reception signal sound under various environment settings.

The cases 3 to 5 caused by the necessity under situations, but the cases 1 and 2 are affected by the psychological state of the user. That is, the present invention considers both the situational conditions and the psychological state of the user. Furthermore, an object of the present invention is to propose a method optimized for the psychological state of the user.

According to another aspect of the present invention, a device maintains information related to a notification message considering the "importance as a message" of the notification message, thereby differentiating the notification message from a spam message to be blocked.

Another object of the present invention is to provide a user interface for enabling the user to easily set a time in order to block output of the reception signal sound with respect to the cases 3 to 5. The user is allowed to easily and intuitively register a situation for which output of the reception signal sound should be blocked, so that the convenience of the user is improved.

Other objects of the present invention not mentioned will be additionally considered, provided that the objects are easily inferred from the detailed description below and the effects thereof.

Technical Solution

To achieve the above-mentioned objects, a user interface method for controlling output of a reception signal sound of a smart device according to the present invention includes the steps of: (a) installing a call-keeper application for blocking output of the reception signal sound in the smart device; (b) executing the call-keeper application to access an address book of the smart device to classify sender information into a first classification (reception alarm contact information) or a second classification (alarm rejection contact information) and set a reception signal sound output environment; (c) receiving, by the smart device, a communication while the call-keeper application is executed; and (d) (1) outputting an alarm signal for notifying reception of the communication as a preset reception signal sound if the communication is received from a sender corresponding to the first classification, (2) calling a muting process code (ring sound volume 0) of operating system software of the smart device if the communication is a telephone call received from a sender corresponding to the second classification, and (3) executing a code for muting a media sound (media sound volume 0) of the operating system software of the smart device if the communication is a notification message received from the sender corresponding to the second classification, wherein a history of reception of the communication is displayed without being deleted from the smart device even if the communication belongs to the second classification.

The step (b) may include selecting a call-keeper mode (including a mode name and a time for controlling output of the reception signal sound) for blocking output of the reception signal sound through a mode setting user interface on an execution screen of the call-keeper application, wherein the method may include a step of receiving the communication normally without performing the step (d) if the time for controlling output of the reception signal sound of the selected mode expires.

The communication of (3) of the step (d) may include a notification message received via a platform of an application (including any one of a utility application, a game application, a SNS application, and a mobile messenger application) installed in the smart device.

The call-keeper mode may be a sleep mode, a meeting mode, a study mode, a rest mode, or an arbitrary user-designated mode.

The communication of the step (c) may be received via a network of a mobile broadband provider.

The communication of the step (c) may be received via an independent application platform.

The communication of the step (c) may be reception of a notification message of a user-originated event generated in an independent application platform.

The call-keeper application of the step (a) may be integrated with the operating system software of the smart device in order to be installed or may be installed by downloading application software through an external platform.

The address book may be a user information list stored in the smart device that the call-keeper application accesses to perform communication.

The address book may be a user information list uniquely possessed by any one piece of application software among a utility application, a game application, a SNS application, and a mobile messenger application installed in the smart device.

The call-keeper application may be executed by a module embedded in the application software.

The smart device may be any one of a smartphone, a tablet PC, and a smart TV.

Advantageous Effects

According to the present invention, a user device may make a user be free from stress or a disturbance in a daily life due to a series of communications received from an unwanted sender or notification signals for notifying the communications, while a history of reception of the communications are maintained normally, so that misunderstanding or inconvenience with respect to a human relationship may be avoided.

Furthermore, according to the present invention, not only situational conditions of the user but also a psychological state of the user is reflected so as to control output a reception signal sound.

Furthermore, the user may block the reception signal sound when performing another operation while manipulating a smart device. That is, even when output of the reception signal sound is blocked, a desired operation may be performed using the smart device. That is, a reception alarm signal of a communication is not received, but various functions and applications may be executed using the smart device. Moreover, a sender is not allowed to detect any difference from a normal communication attempt, so that the sender is unable to recognize a reception signal sound control environment setting of a receiver, is thus not affected mentally.

In addition, according to the present invention, a user interface environment for easily registering various environments of the user (environments in which the reception signal sound is not desired to be output) is provided so as to improve user convenience.

The effects described in the description below and provisional effects thereof which are expected from the technical features of the present invention are regarded as being dis-

※ It should be noted that the accompanying drawings are provided as references to assist in understanding of the technical concept of the present invention, and the scope of the rights of the present invention is not limited thereby.

MODE FOR CARRYING OUT THE INVENTION

Hereinafter, details for carrying out the present invention will be described with reference to the accompanying drawings. Detailed descriptions of related known functions that would be obvious to those skilled in the art will not be provided in order not to unnecessarily obscure the gist of the present invention.

Figure 1:
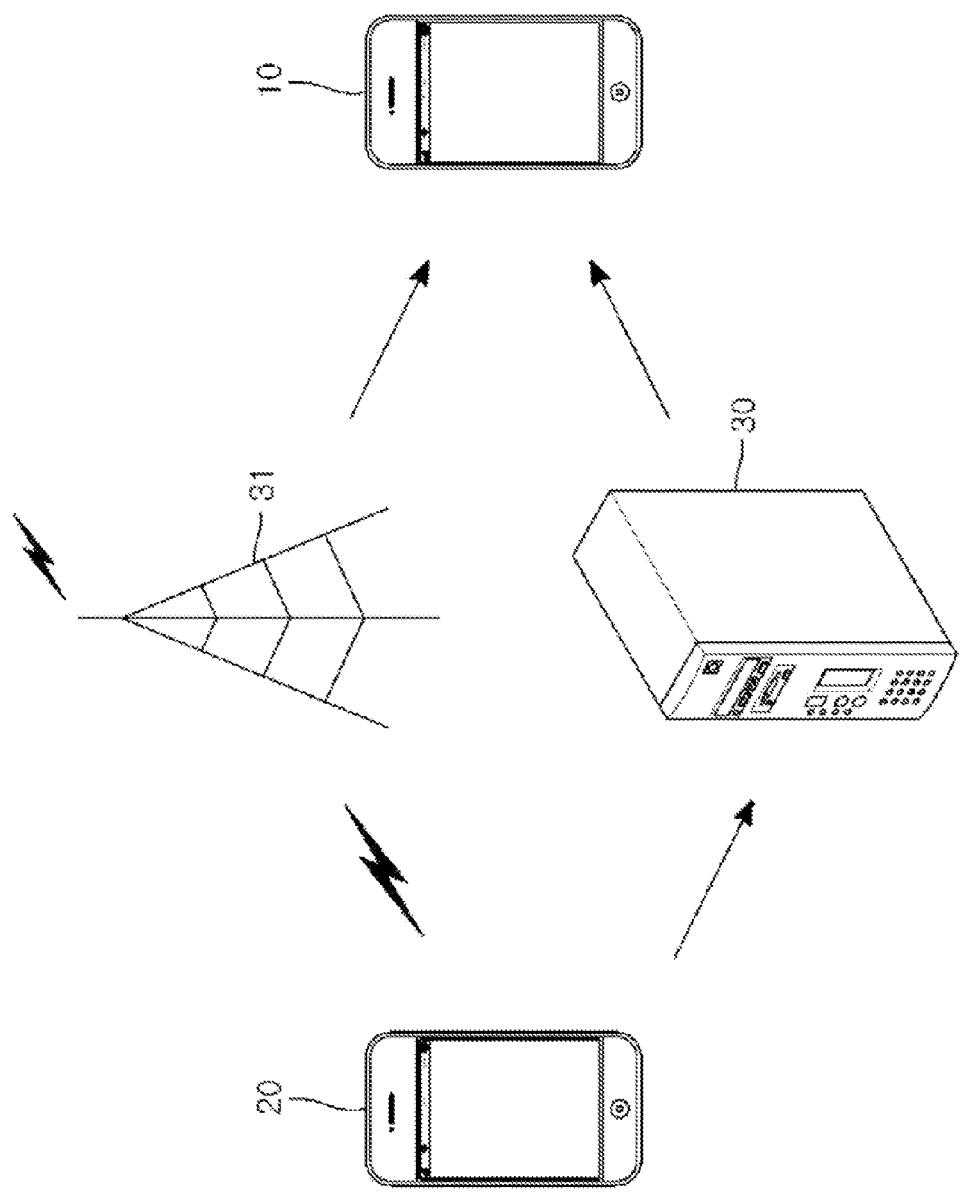
FIG. 1 is a diagram conceptually illustrating an exemplary system configuration according to the present invention.

FIG. 1 illustrates a schematic system configuration according to an embodiment of the present invention. Basic system elements of the present invention are a smart device 20 of a sender, a smart device 10, and networks 30 and 31 for relaying communication. A network or a platform for relaying communication may have various forms and elements. A communication may be transmitted via a mobile communication network such as a 3G or LTE network using a base station 31 of a mobile broadband provider. A call connection request or an SMS message is a representative example of the communication. The communication may be transmitted via an independent application platform server 30. Various notifications using a mobile messenger and a communication network are representative examples of a communication passing through a platform of a provider of various applications installed in a smart device.

Since the aspect of "receiving a communication" is important for the present invention, the present description will be provided from a view of the smart device 10 of a receiver. The smart device 20 of a sender may be the same as or different from the smart device 10 of the receiver.

The smart device 20 generates various communication events (making a call, or transmitting a message), and the smart device performs corresponding communication. A device that is a sender for generating a communication event is not necessarily a smart device such as the smart device 10 of the receiver, and may be a PC or a laptop computer. In FIG. 1, for convenience, this device is illustrated as the smart device 20 without being differentiated from the device of the receiver. This is because recent devices of users are generally smart devices.

The smart device 10 uses, for communication, a unique user account for setting a certain application or user information classified for and stored in an address book. In a smart device of the present invention, application software for controlling and determining whether to output a communication reception signal sound on the basis of an address book and a user account is installed. For convenience, this application is referred as a "call-keeper application" in the present description.

Figure 2:
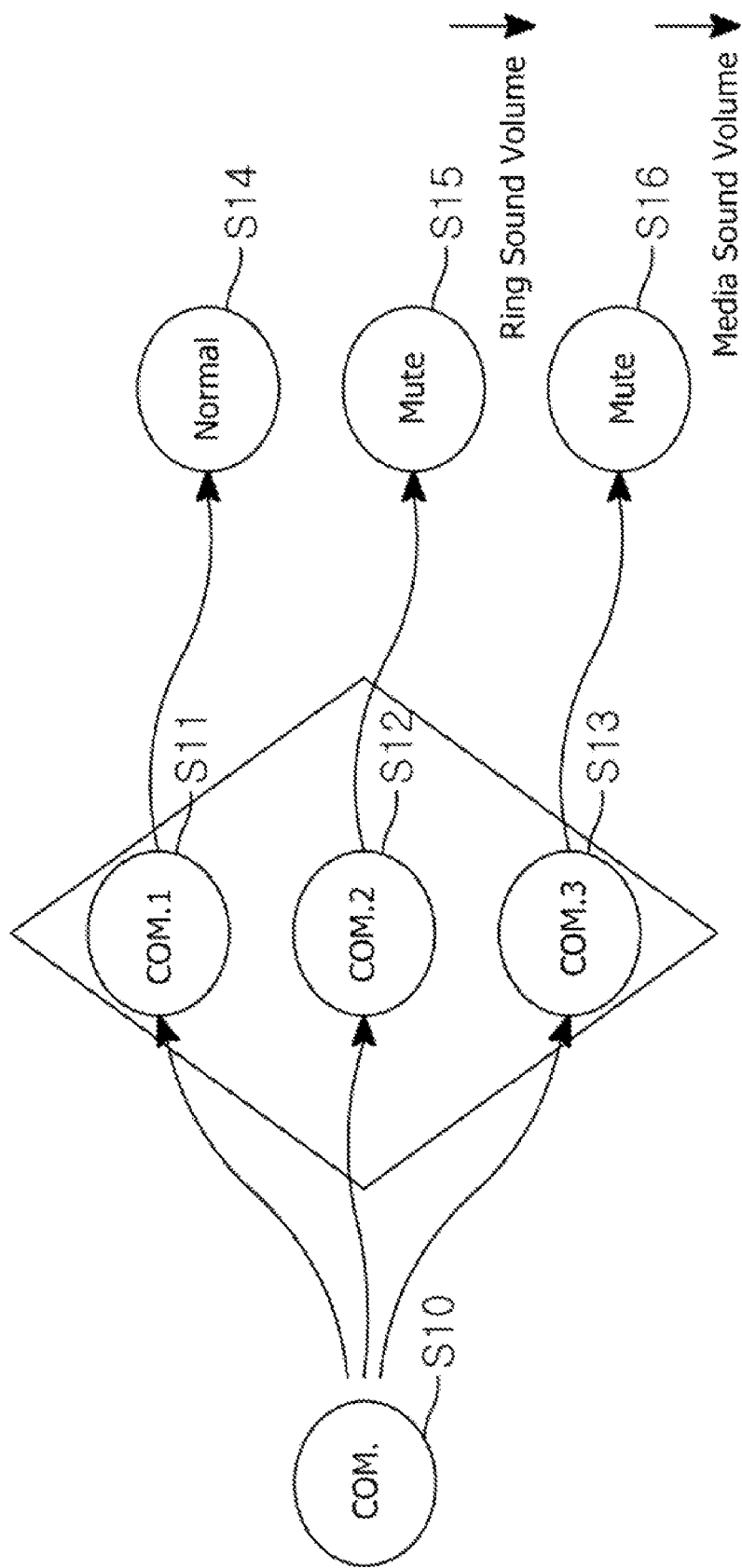
FIG. 2 is a diagram conceptually illustrating an exemplary process for integrally controlling output of a reception signal sound according to the present invention.

FIG. 2 is a diagram conceptually illustrating a process of controlling output of a reception signal sound according to communication reception performed by the call-keeper application of the present invention on the basis of the system of FIG. 1.

Once the smart device 10 receives a communication (S10), a process of the device determines the type of this communication through interoperation between the call-keeper application and an operating system application. The process for controlling the reception signal sound may be differently controlled according to the case where the communication is determined as being a communication by first classification (communication 1, S11), the case where the communication is determined as being a communication by second classification and is a telephone communication that calls a ring sound (communication 2, S12), and the case where the communication is determined as being a communication by the second classification but calls the reception signal sound other than the ring sound (communication 3, S13).

In the present invention, the first classification may be defined as classification of sender information in an address book (contact information) for which a preset ring sound or vibration ("reception signal sound") is output when the smart device 10 receives a communication. That is, contact information that belongs to the first classification is defined as reception alarm contact information. The second classification may be defined as classification of sender information in the address book for which the reception signal sound is not output when a communication is received and various communications that pass through an application platform through an account of the smart device 10 and are set not to output the reception signal sound. In brief, contact information that belongs to the second classification may be defined as alarm rejection contact information.

In the case of a communication corresponding to the communication 1, the smart device receives this communication normally, and outputs the reception signal sound normally according to a setting (S14).

However, in the case of a communication corresponding to the communication 2, the smart device may receive this communication, but may output a muted ring sound without outputting the set ring sound or vibration sound (S15).

Furthermore, in the case of a communication corresponding to the communication 3, the smart device may receive this communication, but may output a muted media sound (S16).

A communication of another category may be added to such a function and process. For example, if a communication 4 is transmitted from a number registered as a spam number, the smart device may be set to reject reception of this communication. According to the present invention as illustrated in FIG. 2, the sender is not aware of such a process in the device of the receiver and is unable to detect the fact that the sender is classified as the communication 2 or the communication 3.

Figure 3:
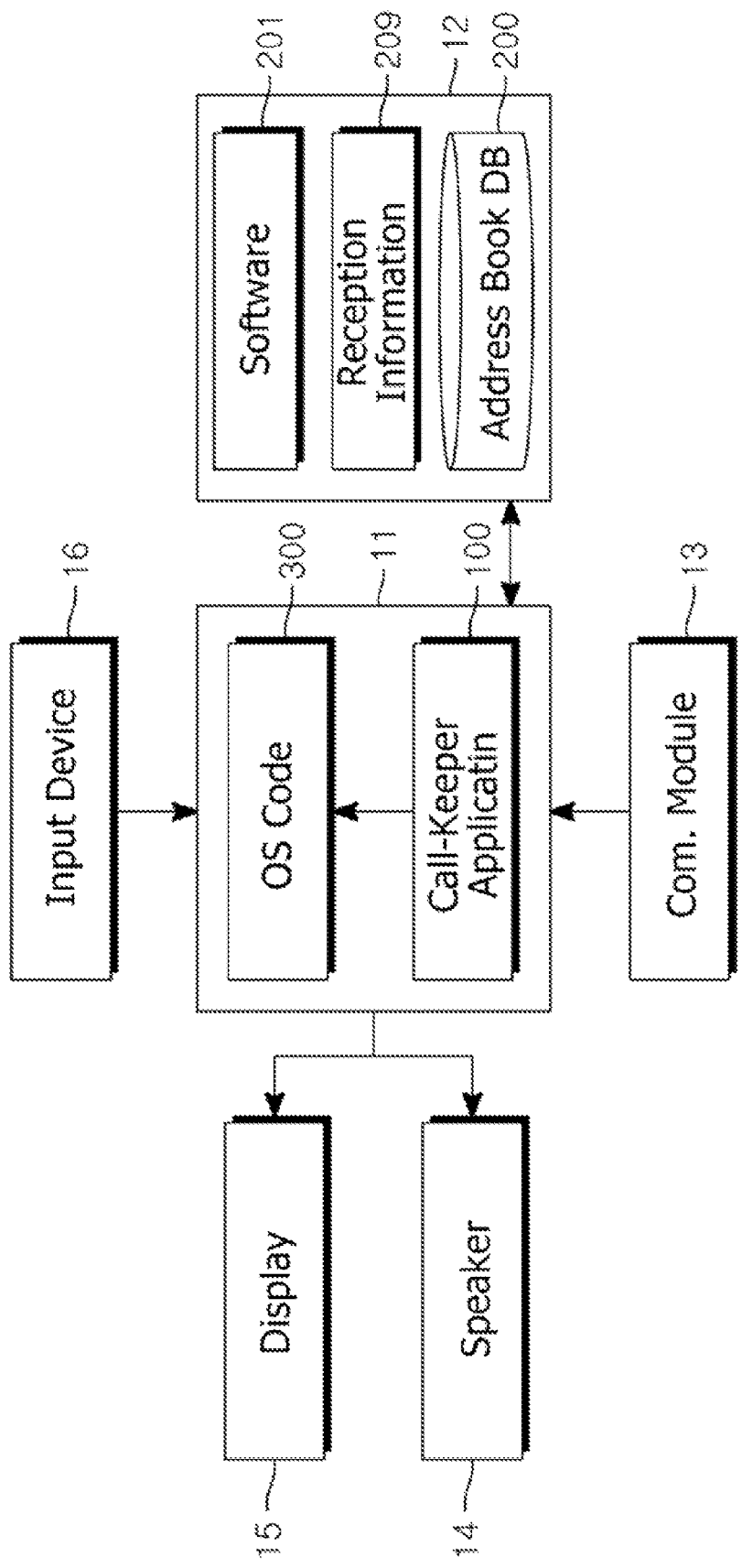
FIG. 3 is a diagram illustrating an exemplary internal electronic configuration of a smart device according to the present invention.

FIG. 3 schematically illustrates an example of an internal configuration of the smart device 10 with a focus on an operational relation between elements.

In the description of the present invention, the smart device 10 for performing a communication function is a computing device. Preferably, the smart device 10 refers to a mobile computing device that performs processes determined by operating system software and various applications, such as a smartphone or a tablet PC, and a smart TV interworking with a smartphone or a table PC. Furthermore, the smart device of the present invention has an input device 16 with a hardware input device or a software input device for detecting a touch event. A speaker 14 and a display 15 are provided as output means.

A communication module 13 serves to exchange data with an external device. Various communications are received by the smart device 10 through the communication module 13. An internal memory 12 of the smart device 10 provides a place for storing data and computer codes generally used in the device. The internal memory 12 stores software 201 installed in the device, an address book DB 200 containing information such as a phone number or an electronic mail is positioned in the internal memory 12, and reception information 209 received through communication is stored in the internal memory 12 of the device.

A processor 11 executes computer codes with an operation system, and performs operations of generating and using data. Furthermore, the processor 11 may receive and process input/output data between components of the smart device 10 using a series of commands. Moreover, the processor 11 serves as a control unit for performing a function of application software installed in the smart device. In addition, the processor 11 performs a predetermined software function of an application for a smart device by the communication module 13, and performs a control operation so that an alarm message is presented using a GUI element of a screen or an output means such as a speaker when a communication is received.

In FIG. 3, for convenience, an OS and the call-keeper application are positioned in the processor 11. This is for emphasizing that a function of the processor as a control unit is performed by the OS and the call-keeper application.

Once the smart device 10 receives a communication through the communication module 13, the processor 11 controls output of the reception signal sound according to the communication. At this time, a call-keeper application 100 determines whether the communication is a communication of a sender belonging to the first classification or a communication of a sender belonging to the second classification on the basis of the address DB 200 stored in the internal memory 12 of the smart device 100. This determination may be performed using a user account of the smart device 10 (e.g., a notification message passing through an application platform). If the communication belongs to the second classification, a muting process code 300 of an OS is called using an OS platform API, so that the reception signal sound is not called through the speaker 14.

Even though the communication belongs to the second classification, the communication is received and information on this communication is recorded and stored in the smart device, since only the output of the reception signal sound is blocked. That is, reception per se is not blocked like a spam blocking function.

Furthermore, since the reception signal sound is called mutedly using an OS code, execution of another function of the smart device is not affected. For example, if a user is not willing to receive a call from a "certain sender" but wants to continue to surf the Internet through a smartphone or perform typical smartphone manipulation such as executing a specific application or playing a game, this psychological state of the user may be optimally reflected. It gives inconvenience to the user to restrict the use of a smartphone itself in order to perform a function of blocking the output of the reception signal sound according to a sender.

Figure 4:
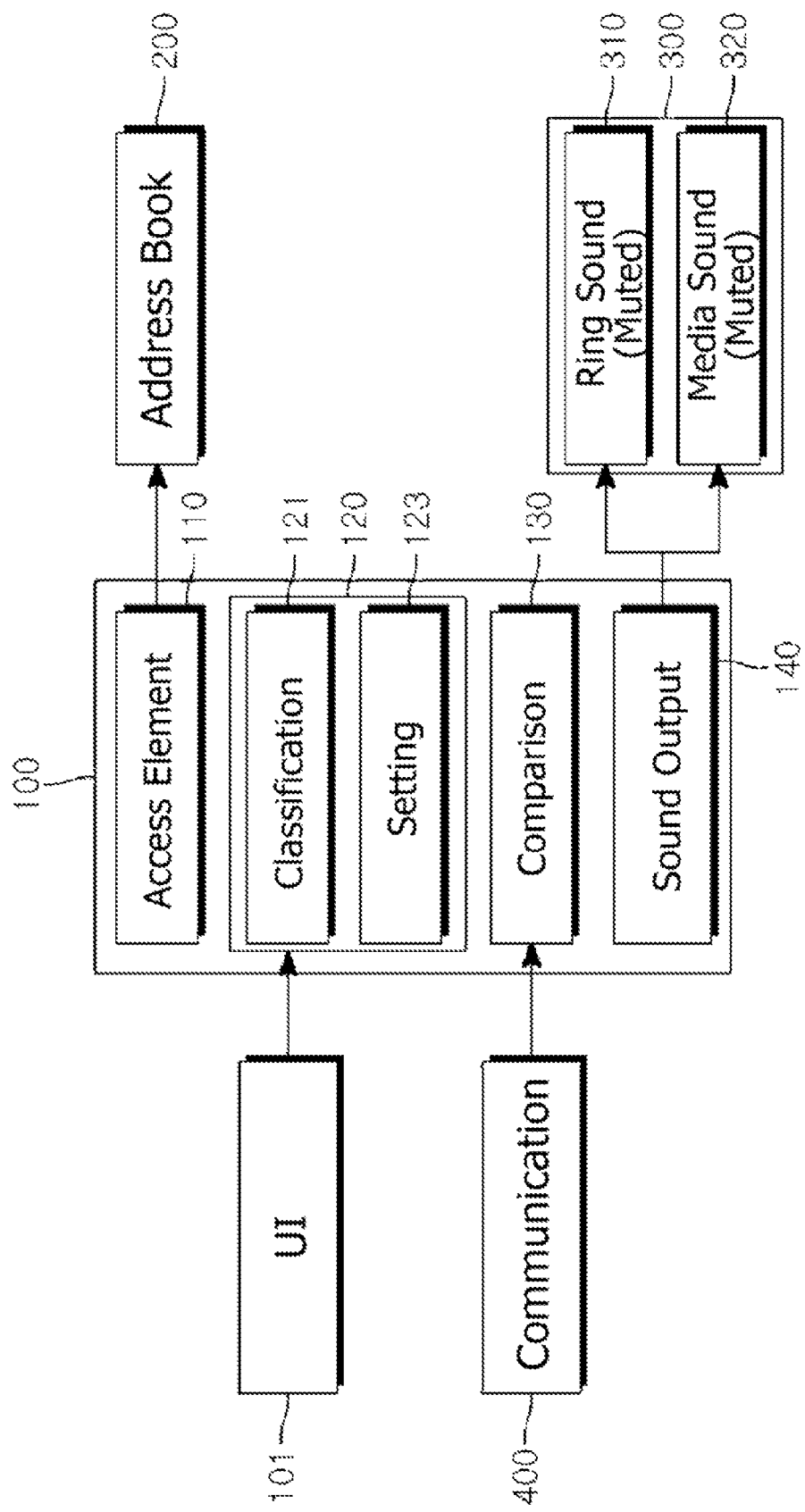
FIG. 4 is a diagram illustrating an exemplary module configuration of a call-keeper application 100 according to the present invention.

As illustrated in FIG. 4, the call-keeper application 100 may include an address book access element 110, a function setting element 120, a comparison element 130, and a reception signal sound output element 140. These software elements may be variously configured according to an interface for development, a development rule, and a standard defined by operating system software of the smart device.

The address book access element 110 performs a function of accessing the address book information stored in the memory of the smart device. In an embodiment of the present invention, an address book may represent the address book information stored in the memory of the smart device 10. That is, in this embodiment, the address book of the call-keeper application 100 is a user information list for performing communication by accessing the address book stored in the memory of the smart device 10.

In another embodiment of the present invention, the address book may be a user information list uniquely possessed by any one piece of application software among a utility application, a game application, a SNS application, and a mobile messenger application installed in the smart device 10.

The function setting element 120 may be presented on a screen through a user interface 101 of the smart device. The function setting element 120 may include a classification designation element 121 and an environment setting element 123. The classification designation element 121 provides a user interface for classifying users as the first classification or the second classification to set, change or delete the users. The environment setting element 123 provides an interface for determining when to execute the call-keep application or what function is to be added, changed or removed. Although not illustrated in the environment setting element 123, a user interface for setting various modes is included therein (see FIGS. 8 and 9).

Contact information of the first classification corresponding to reception alarm contact information may be obtained by excluding contact information set as the second classification (alarm rejection contact information) from pieces of contact information. On the contrary, the contact information of the second classification may be obtained by excluding the contact information set as the first classification. Meanwhile, in the case of contact information that is not classified in advance in the address book of the user of the smart device 10 (e.g., new contact information), the contact information is regarded as contact information of an importance sender so as to be automatically classified as the first classification, in some embodiments. Classification designation of a sender through the classification designation element 121 may be construed as at least one of the classification designations below:

designating the entirety of sender information stored in an address book as the second classification;

designating the entirety of sender information not stored in the address book as the second classification;

designating only a part of sender information as the first classification and designating the remaining sender information as the second classification;

designating only a part of sender information as the second classification and designating the remaining sender information as the first classification; and designating a communication passing through a platform of a part or the entirety of application software installed in a smart device as a communication of a sender belonging to the first classification or the second classification (for example, the call-keeper application of the present invention may determine whether or not to output the reception signal sound with respect to a notification communication received via a platform of a specific application).

When a communication is received from a certain sender, the comparison element 130 determines whether the sender information of the communication is contact information belonging to the first classification or corresponds to the second classification according to classifications and rules set by the function setting element 120.

The reception signal sound output element 140 may preferably perform a function of outputting the muting process code 300 of the OS. A sound of the OS output through a speaker may be classified into the parameters below:

(1) ring;
(2) notification;
(3) music;
(4) alarm;
(5) system; and
(6) voice call The reception signal sound of a smart device may be emitted using the five types of sounds other than the voice call sound. The case (1) relates to the case where a communication is a telephone call. The remaining cases (2) to (5) are selectively used by developers in the case where a communication is a reception alarm of a SNS message or delivers alarm notifications of various applications (e.g., notification of a comment event in Facebook, or notification of e-mail reception).

In a preferred embodiment of the present invention, in the case where a communication belongs to the second classification, a muted sound may be called while the volume of a sound that notifies reception of the communication is set to 0. That is, in the case where a communication belonging to the second classification is received, an OS code 310 for calling a ring sound in a muted state (volume 0) may be performed, if the communication is a telephone call (in the case of the case (1)). In the case where a communication belonging to the second classification is received, an OS code 320 for calling a media sound (defined as a term including all the cases (2) to (5)) in a muted state (volume 0) may be performed, if the communication is a communication other than a telephone call. These set values of volume 0 are set by the call-keeper application in advance.

The reception signal sound output element 140 performs a control function so that a control command for outputting the reception signal sound is guaranteed to be transferred to an output unit in the case of a communication belonging to the first classification, and a code for performing a muting process is called from operating system software to call a muted sound through the OS in the case of a call belonging to the second classification. Since a media manager of a smart device change a set value of a control command for outputting a typical reception signal sound into a set value for outputting a muted sound, functions other than a function of outputting the reception signal sound are guaranteed to operate normally. Therefore, a communication may be received normally, and information on the communication may be recorded in a device memory and may be displayed on a user interface (screen). The user of the smart device may check the record of the communication information later.

Figure 5:
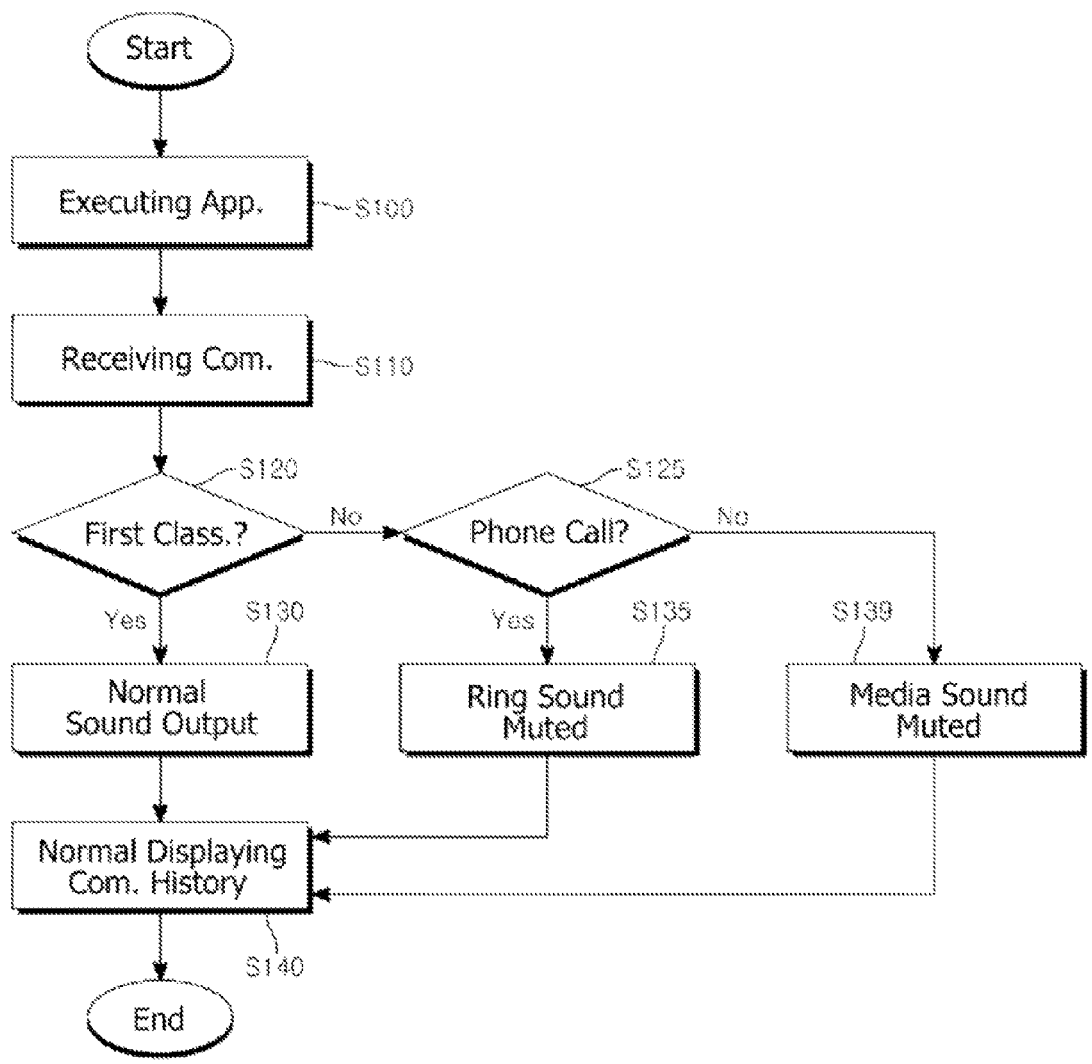
FIG. 5 is a flowchart illustrating control of output of a reception signal sound of a smart device according to an embodiment of the present invention.

FIG. 5 schematically illustrates an overall process of a method related to execution of the call-keeper application according to a preferred embodiment of the present invention. The above-described call-keeper application is installed in the smart device. The user executes the call-keeper application using an input means, accesses the address book of the smart device to designate sender information as the first classification (reception alarm contact information) or the second classification (alarm rejection contact information), and sets an output environment of the reception signal sound.

In particular, according to a preferred embodiment of the present invention, a call-keeper mode for scheduling output of a reception signal may be registered, and its execution mode may be designated to be selected. Here, the call-keeper mode includes a name of a mode and a time for controlling output of the reception signal sound.

Firstly, the call-keeper application is executed (S100). The user could have already designated the first classification and the second classification using a user interface for designating a classification through execution of the call-keeper application. Furthermore, according to a preferred embodiment, the user may select a specific call-keeper mode using the user interface.

Next, the smart device receives a communication (S110). This communication is generated by another user located in a network. As described above with reference to FIG. 1, this communication may pass through a network of a mobile broadband provider, or may pass through platforms of various application providers.

It is determined whether the communication is from a sender corresponding to the first classification (reception alarm contact information) or a sender corresponding to the second classification (alarm rejection contact information) (S120). In the case where the communication is from the sender corresponding to the first classification, the reception signal sound set in the smart device is output normally as a notification signal for notifying reception of the communication (S130). In the case where the communication is from the sender corresponding to the second classification in step S120, it is determined whether the communication is a telephone communication (S125).

In the case where the communication of the second classification is reception of a telephone call in step S125, the muting process code of the OS for setting the volume of a ring sound to 0 is performed to output a muted sound as the reception signal sound (S135).

In the case where the communication of the second classification is reception of a communication other than a telephone call in step S125, a muting process code for setting a media volume (including the volumes of the notification sound, music sound, alarm sound and system sound set as sound output means of the operating system software) to 0 is performed to output a muted sound as the reception signal sound (S139).

Reception per se is not blocked in steps S135 and S139, but the muting process code of the operating system software is used so that an environment for optimally reflecting psychological conditions of the user may be provided. For example, even if the entire sender information of the address book is designated as the second classification and the call-keeper application is executed, the user of the smart device may freely use various functions of the device. That is, the user simply dislikes listening to the reception signal sound when receiving a call or a message from somebody. This is the same for the reverse conditions. Even when the user of the smart device manipulates the device, execution of a function of the call-keeper application according to classification designation is not affected.

According to the present invention, regardless of whether the reception signal sound is output to the smart device, a communication is received normally, and history information on communication reception is recorded and stored (S140).

Figure 6:
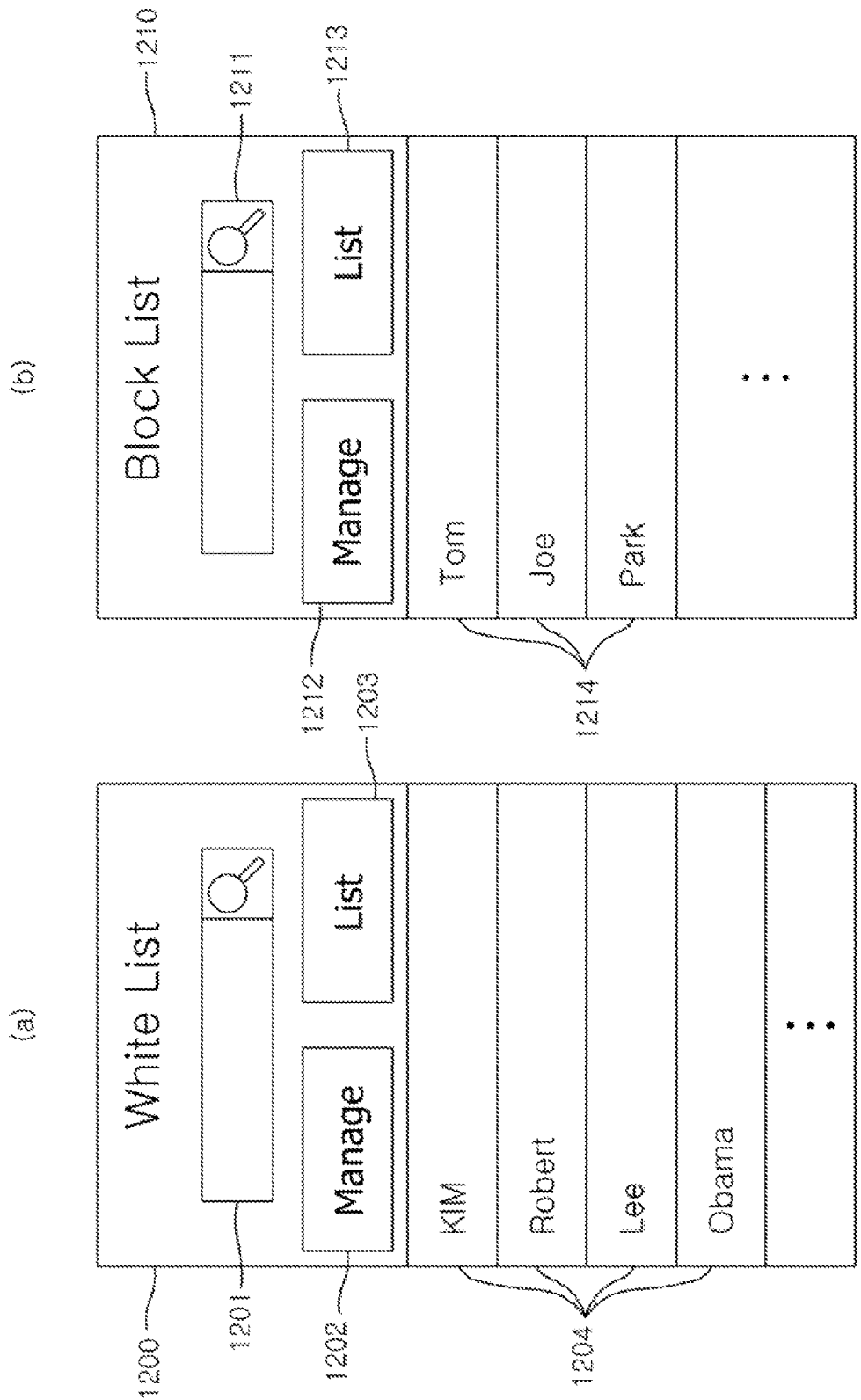
FIG. 6 is a diagram illustrating an exemplary classification designation UI of a call-keeper application according to an embodiment of the present invention.

FIG. 6 exemplarily illustrates a user interface of the classification designation element 121 of FIG. 4. FIG. 6(a) illustrates an example of a screen configuration for designating the first classification, and FIG. 6(b) illustrates an example of a screen configuration for designating the second classification.

A user screen 1200 of FIG. 6(a) may include a search window 1201, a management button 1202 for designating, changing or deleting the first classification, and a list button 1203. With respect to a communication from a user included in a list 1204 designated as the first classification, the reception signal sound is output normally even if the call-keeper application is executed.

A user screen 1210 of FIG. 6(b) may include a search window 1211, a management button 1212 for designating, changing or deleting the second classification, and a list button 1213. Even if a communication is received from a user included in a list 1214 designated as the second classification, the reception signal sound is muted.

Figure 7:
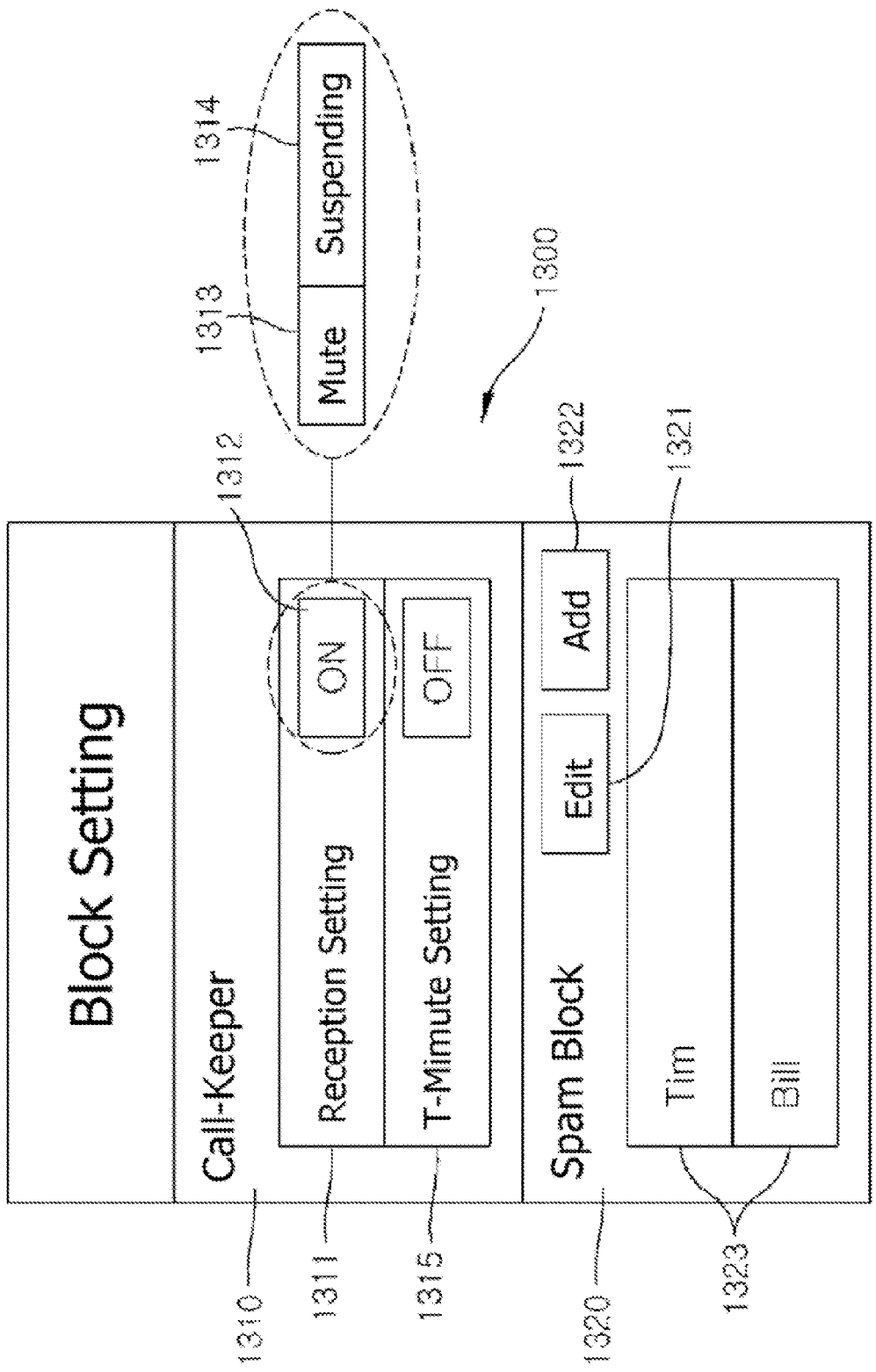
FIG. 7 is a diagram illustrating an exemplary environment setting UI of a call-keeper application according to an embodiment of the present invention.

FIG. 7 exemplarily illustrates a user interface of the environment setting element 123 of FIG. 4. As illustrated in FIG. 7, the call-keeper application of the present invention may include not only the call-keeper function described in detail in the present description but also a spam blocking function. Through this embodiment, a difference between the call-keeper function and the spam blocking function will be more apparent. A reception setting button 1311 of a call-keeper area 1310 may be set to be on/off. Once the button 1312 set to be on is selected, a corresponding UI may display a muting button 1313 and a reception suspending button 1314. The muting button 1313 allows the volume of a ring sound/media sound to be set to 0 using an API of the OS so that a muted sound is called, as described above. A series of functions are executed normally on the user screen.

The reception suspending button 1314 is equal in process to the muting button 1313 in that the reception signal sound is not output, but the reception suspending button 1314 may be configured not to display a UI. In this case, the user may be considered not to use the smart device. This case may correspond to an embodiment in which a communication is received, but a notification is not displayed on a UI and a history of reception of the communication is simply recorded. The exemplary function of the reception suspending may be modified into a function of blocking reception of a communication.

A repetition setting button 1315 is an interface for setting a function for regarding a communication received repeatedly "for T minutes" as a communication of the first classification to receive a call. This is because there may exist an emergency call.

An editing button 1321 and an addition button 1322 of a spam blocking area 1320, and a list derived thereby may be construed as a known reception rejection configuration.

Figure 8:
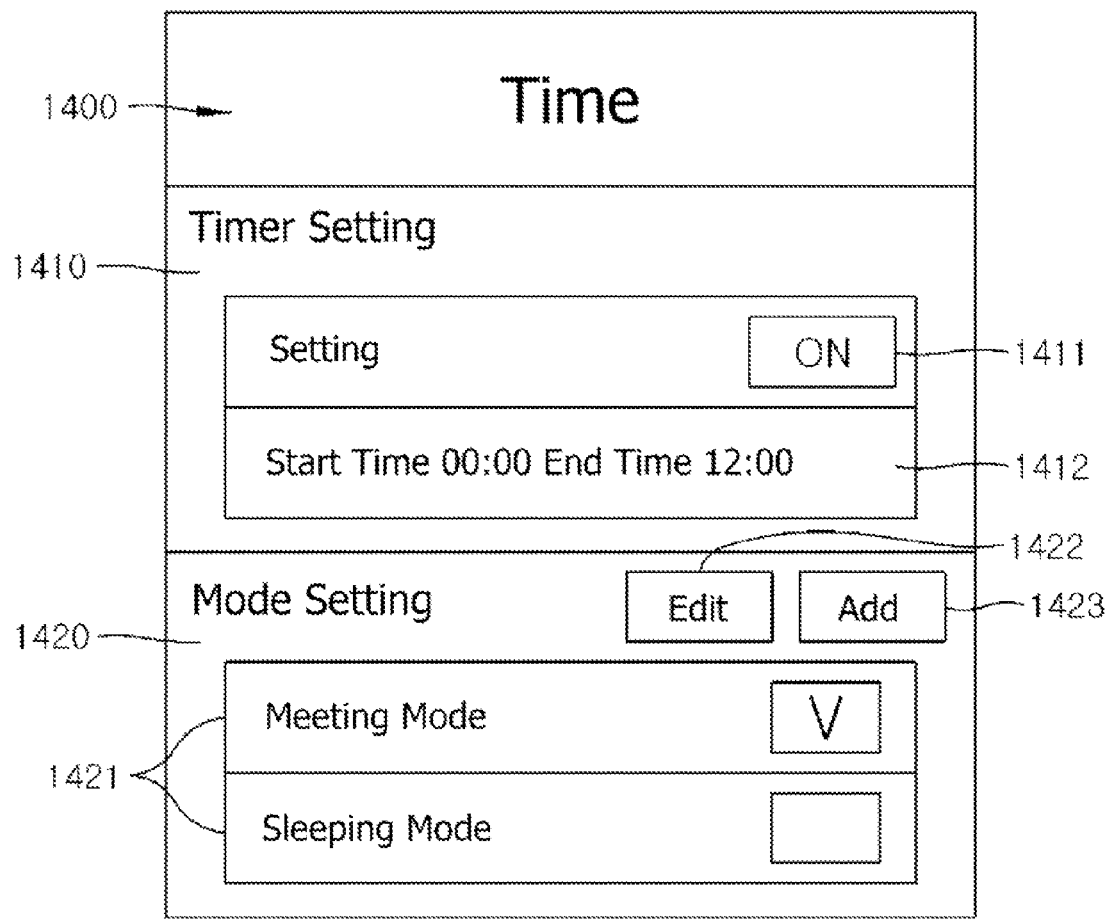
FIG. 8 is a diagram illustrating an exemplary time setting UI of a call-keeper application according to an embodiment of the present invention.

FIG. 8 exemplarily illustrates a timer setting user interface according to a preferred embodiment of the present invention. According to the present invention, by setting a time for which the call-keeper application is executed, the convenience of a user may be improved.

As illustrated in FIG. 8, a time setting UI 1400 may include a timer setting area 1410 and a call-keeper mode setting area 1420. The timer setting area 1410 may include a button 1411 for selecting whether to perform setting and a time display area 1412. The button 1411 may be selected between ON/OFF, and is configured so that the call-keeper application is executed for a set time according to selection of ON. Furthermore, although not illustrated, a UI for designating a time may be popped up.

The call-keeper mode setting area 1420 may include a mode provided by default by application software and/or a mode newly registered by the user. For example, a "meeting mode" and a "sleeping mode" of a mode list 1421 are representative situations in which the user is not willing to receive an incoming call, and thus may be designated by default.

Regarding the call-keeper mode, an editing button 1422 may be selected to change a time and a name of the call-keeper mode and an addition button 1423 may be selected to newly register a mode by the user.

Figure 9:
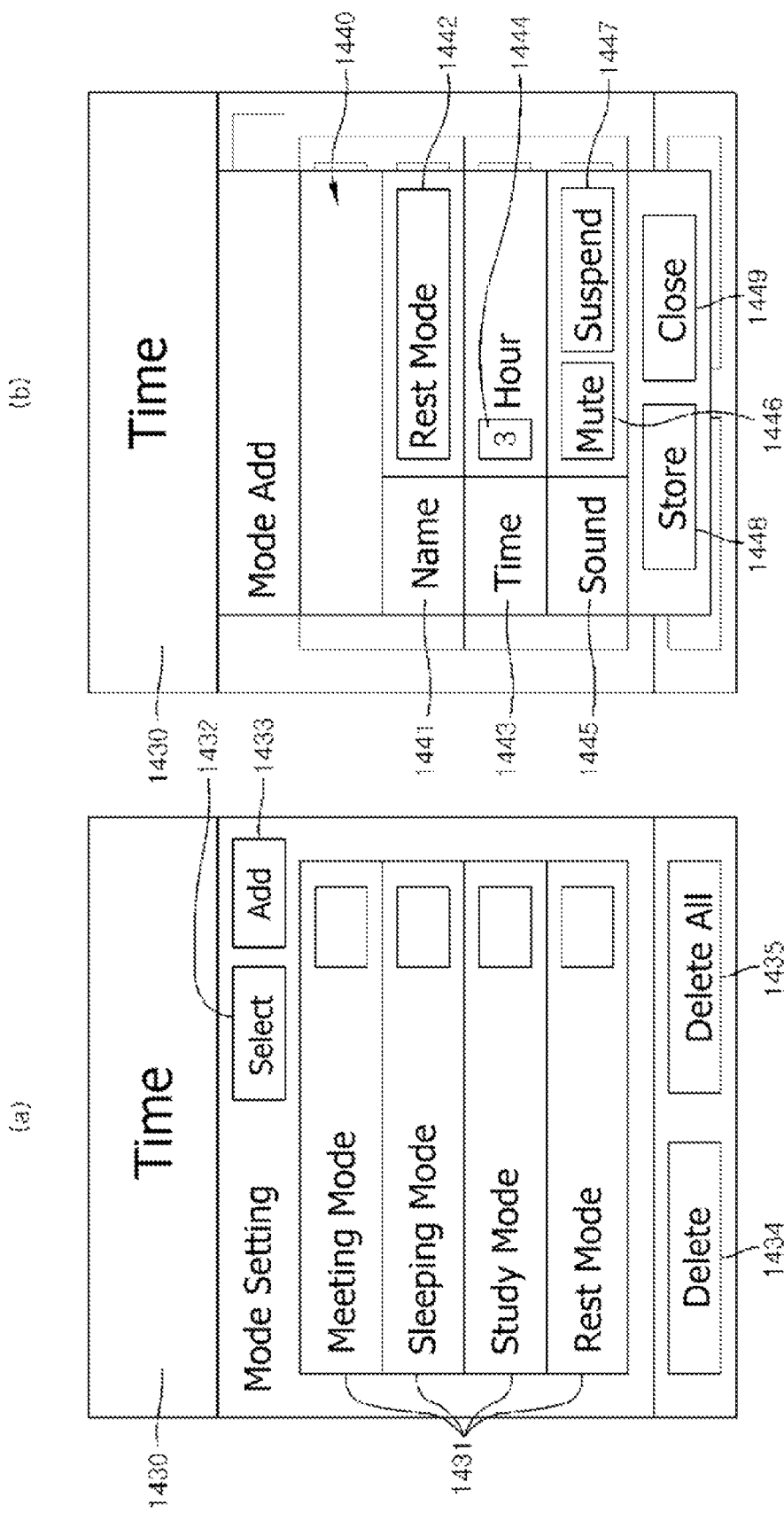
FIG. 9 is a diagram illustrating an exemplary mode setting UI of a call-keeper application according to an embodiment of the present invention.

FIG. 9 exemplarily illustrates a mode setting screen 1430 presented on a display screen when the addition button 1423 of FIG. 8 is selected. FIG. 9(a) illustrates a list of all the call-keeper modes registered in the smart device, and FIG. 9(b) exemplarily illustrates a screen configuration for newly adding and registering a call-keeper mode.

As illustrated in FIG. 9(a), the call-keeper mode of the present invention is provided with a user interface for selecting a plurality of schedule setting modes. For example, a meeting mode, a sleeping mode, a study mode, and a rest mode may be included. These examples are representative situations in which it is necessary to control output of the reception signal sound of a communication. Once an addition button 1433 is selected from this UI, a mode addition UI 1440 may be popped up as illustrated in FIG. 9(b). The user may input a mode name into a text box 1442 of a mode name area 1441 to register the mode name. For example, a movie viewing mode, a travel mode, and a lecture mode may be input.

Furthermore, a time area 1443 may be selected to input, by numbers, a time for which the call-keeper application is executed into a text box 1444. If 3 hours are input to the text box 1444, the call-keeper application may be executed for three hours after execution of the call-keeper application is started. That is, the set time may represent a total time for which a mode is executed to control output of the reception signal sound.

Furthermore, in a preferred embodiment of the present invention, a method for outputting the reception signal sound may be selected. For example, if a muting button 1446 is selected from a reception sound area 1445, the reception signal sound may be muted to be output while reception is performed normally. Furthermore, if a reception suspending button 1447 is selected, in an embodiment of the present invention, (1) reception is performed normally but a display method for a UI is changed (for example, a notification message is not allowed to appear on a UI), or, in another embodiment of the present invention, (2) a process may be selected so that reception is blocked when a mode is performed and a reception history is displayed after the mode released.

If a storage button 1448 on the user screen is pushed, a mode addition setting process is completed, and, if a closing button 1449 is pushed, an added process is not registered.

The present invention may provide a preferred embodiment more adapted to a communication received from a sender of the first classification (e.g., reception of a telephone call or a message). A message for informing of a specific mode situation set in a smart device of a receiver may be set to be automatically sent to a smart device of the sender of the first classification in the form of a text and/or a voice. This is an application example in which the contents and a release time of a set mode are notified to the sender of the first classification. For example, in the case where a meeting mode is set and a set time is two hours (14:00-16:00), a message of "I'm having a meeting now. The meeting will be finished at around four o'clock." may be automatically notified if a telephone call is received from the sender of the first classification at around 15:00. Such a notification is not provided for a communication of the second classification.

Registration of a setting of a specific schedule mode is not limited to the above-mentioned exemplary mode. Although not illustrated, a "repetition mode" may be additionally configured. In this case, a situation repeated in a regular pattern (e.g., a lesson) may be set in a device. For example, if the mode is set to be "50-minute repetition", the call-keeper application may be executed for 50 minutes, and may be executed for 50 minutes again after a 10-minute break. In addition, various modifications may be made.

In the present invention, a communication may be based on a network of a mobile broadband provider as described above. A telephone call, a short message, or a long message may be such a communication. In another embodiment of the present invention, a communication may be received via a platform of an independent application platform. A representative example of such a communication is a mobile message received via a mobile messenger platform.

In another embodiment of the present invention, the communication may be a notification message of a user-oriented event transmitted to a smart device by an application platform server that provides a specific application. For example, the communication includes a comment or a message intended to be viewed through an Internet webpage by a smart device, a request for a new SNS relationship, a response to an article updated by a user of a smart device, and an event of requesting real-time chatting.

In still another embodiment of the present invention, the communication may be a voice communication passing through an application platform. That is, the communication may be a response request for a real-time conversation channel established in a platform provided by not a mobile communication network but an application server. If the user accepts this request, users of smart devices may have a telephone conversation in real time.

As described above, the present invention is premised on communication between smart devices. However, since there exist a large number of users on a network, a smart device manages the users using an address book. A communication received through an application platform server is generally registered in an address book possessed by a smart device. A communication not registered in the address book may correspond to the case of requesting a new relationship in a SNS network such as Facebook™.

In a preferred embodiment of the present invention, an address book may be stored in a memory of a smart device. In this case, various pieces of application software installed in the smart device access the address book stored in the smart device. The address book stored in the memory of the smart device includes user information registered in the smart device by default, such as a telephone number. The pieces of application software may access this telephone number information stored in the memory. Furthermore, the pieces of application software may possess a list of user information uniquely possessed, for example, ID (user account) information of a user who has subscribed to an application platform. However, such information is frequently stored in a server of an application provider instead of being stored in a device.

That is, in another preferred embodiment of the present invention, the address book may be stored in a database of an application platform server.

Applications provided by the application platform server and installed in a smart device have the types below:

a utility application (in the present invention, a utility application allows communication between users using an address book);

a game application (in the present invention, a game application allows communication between users using an address book);

a SNS application (a list of user information about a user account serves as an address book, as in Facebook or Twitter);

an application for performing an e-mail transmitting/receiving function using an e-mail account (an e-mail account serves as an address book); and a mobile messenger application (a mobile instant message (MIM) is transmitted or conversations of real-time chatting are exchanged using a user account).

The call-keeper application of the present invention may be integrated with operating system software of a smart device so as to be installed. In this case, the call-keeper application may be installed by default when the smart device is manufactured, or may be integrated with an OS when the OS is updated. In another embodiment of the present invention, the call-keeper application may be downloaded to the smart device through an external platform (e.g., an application store) so as to be installed. As described above, in a preferred embodiment of the present invention, the call-keeper software may be independent application software.

Furthermore, in another preferred embodiment of the present invention, a function of controlling output of the reception signal sound may be installed in the smart device as modules embedded in the above-mentioned pieces of application software (a utility application, a game application, a SNS application, and a mobile messenger application).

The method for controlling output of the reception signal sound of a smart device and the user interface method in which the call-keeper mode is selected, according to an embodiment of the present invention, may be implemented as a program code executable by various computers so as to be recorded in a computer readable medium. The computer readable medium may include a program code, a data file, and a data structure, taken alone or in combination. The program code recorded in the medium may be specially designed for the present invention or may be well known and available in the technical fields of computer software. Examples of the computer readable recording medium may include a hardware device specially configured to store and execute a program code, such as hard disks, floppy disks, magnetic media such as magnetic tapes, optical media such as CD-ROMs and DVDs, magneto-optical media such as floptical disks, ROMs, RAMs, and flash memories. Examples of the program code include machine language codes made by compilers and high-level language codes that can be executed by computers using interpreters. The above-mentioned hardware device may be configured to be operated as one or more software modules for performing operations of the present invention and vice versa.

Regarding the drawings of the present invention, each block may represent a part of a module, a segment or a code including one or more executable instructions for performing specific logical function(s). Furthermore, it should be noted that mentioned functions of blocks may be performed in arbitrary order. For example, two contiguous blocks may be performed at substantially the same time, or may be performed in reverse order according to corresponding functions. In addition, the dimensions of the elements in the drawings are exaggerated for convenience.

The protection scope of the present invention is not limited to the above disclosure and terminology of the embodiments. Furthermore, the protection scope of the present invention should not be limited due to modifications or replacements that would be obvious in the technical field to which the present invention belongs.

The invention claimed is:

1. A method for controlling audible notification of a communication arriving at an electronic device, the method comprising:
    operating in a call-keeper mode to control an audible notification of communications received at the electronic device;
    receiving a communication during the operation of the call-keeper mode;
    identifying a classification associated with the received communication;
    determining whether to modify an audible notification for the received communication based on the identified classification associated with the received communication; and
    outputting a modified audible notification based on the determining, wherein outputting the modified audible notification includes:
    modifying a volume of a ringtone when the received communication is an incoming call;
    modifying a volume of another notification sound when the communication is other than an incoming call; and
    displaying a visual history of the received communication for all identified classifications.

2. The method of claim 1, further including:
    displaying a user interface for receiving input to control a type of the call-keeper mode and a time duration for operating in the call-keeper mode.

3. The method of claim 1, wherein the communication other than the incoming call comprises a notification message received via a utility application, a game application, a SNS application, or a mobile messenger application.

4. The method of claim 2, wherein the type of call-keeper mode includes a sleep mode, a meeting mode, a study mode, a rest mode, or a user-designated mode.

5. The method of claim 1, wherein the receiving of the communication includes receiving a notification message of a user-originated event generated in an application platform.

6. The method of claim 1, wherein the mode is integrated with the operating system software of the electronic device or is provided by downloading a separate application software through an external platform.

7. The method of claim 1, wherein the identifying the classification associated with the received communication includes:
    comparing sender information associated with the received communication against an address book stored in the electronic.

8. The method of claim 1, wherein the electronic device includes a smartphone, a tablet PC, or a smart TV.

9. The method of claim 1, wherein modifying a volume of a ringtone and modifying a volume of another notification include muting the volume of the ring tone and muting the volume of the other notification respectively.

10. The method of claim 1, wherein determining whether to modify an audible notification includes:
    determining whether the identified classification associated with the received communication is designated to output a preset audible notification with a modified volume.

11. The method of claim 1, further including:
    storing information of the identified classification associated with the received communication.

12. A method for controlling audible notification of a communication arriving at an electronic device, the method comprising:
    operating in a call-keeper mode to control an audible notification of communications received at the electronic device;
    receiving a communication during the operation of the call-keeper mode;
    identifying a classification associated with the received communication;
    determining whether to modify an audible notification for the received communication based on the identified classification associated with the received communication; and
    outputting a modified audible notification based on the determining,
    wherein the identifying the classification associated with the received communication includes: comparing sender information associated with the received communication against an address book stored in the electronic, and wherein the address book is associated with one or more of application software including a utility application, a game application, a SNS application, or a mobile messenger application.

13. A method for controlling audible notification of a communication arriving at an electronic device, the method comprising:
    operating in a call-keeper mode to control an audible notification of communications received at the electronic device;
    receiving a communication during the operation of the call-keeper mode;
    identifying a classification associated with the received communication;
    determining whether to modify an audible notification for the received communication based on the identified classification associated with the received communication; and
    outputting a modified audible notification based on the determining,
    wherein the method further comprises: displaying a user interface for receiving input to control a type of the call-keeper mode and a time duration for operating in the call-keeper mode,
    wherein the type of call-keeper mode includes a sleep mode, a meeting mode, a study mode, a rest mode, or a user-designated mode, the method further includes:
    responsive to the determining, sending an automated message to a sender of the received communication, wherein contents of the automated message is based on the type of the call-keeper mode.

14. A method for controlling audible notification of a communication arriving at an electronic device, the method comprising:
    operating in a call-keeper mode to control an audible notification of communications received at the electronic device;
    receiving a communication during the operation of the call-keeper mode;

identifying a classification associated with the received communication;

determining whether to modify an audible notification for the received communication based on the identified classification associated with the received communication; and outputting a modified audible notification based on the determining, wherein the identifying the classification associated with the received communication includes comparing sender information associated with the received communication against an address book stored in the electronic, and wherein the method further comprises:

responsive to the comparing the sender information associated with the received communication against the address book stored in the electronic device, performing the following:

when determining that the sender information associated with the received communication is missing from the addressed book, classifying the received communication in a classification where a preset audible notification is outputted without a modification.

15. An electronic device for controlling output of audible notification, the electronic device comprising:

a storage unit configured to store information on a classification of a communication received by the electronic device that selectively causes a volume of a notification for the communication to be adjusted;

a receiving unit configured to receive a communication to be notified; and a processing unit configured to access the storage unit to identify the classification of the received communication, and responsive to the identified classification, adjust the volume of the notification for the received communication, wherein the storage unit is configured to store the information on the classification that includes a first classification for outputting the notification with unadjusted volume and a second classification that causes the adjustment of the volume of the notification.

16. The electronic device of claim 15, wherein the processing unit is configured to identify the classification of the received communication based on a comparison of sender information associated with the received communication and the stored information on the classification.

17. The electronic device of claim 16, wherein the notification for the received communication includes a ringtone or a notification sound.

18. An electronic device for controlling output of audible notification, the electronic device comprising:

a storage unit configured to store information on a classification of a communication received by the electronic device that selectively causes a volume of a notification for the communication to be adjusted;

a receiving unit configured to receive a communication to be notified; and a processing unit configured to access the storage unit to identify the classification of the received communication, and responsive to the identified classification, adjust the volume of the notification for the received communication, wherein the processing unit is further configured to mute the sound of the notification for the received communication responsive to the identified classification.

* * * * *